(12) United States Patent
Lin et al.

(10) Patent No.: US 7,130,864 B2
(45) Date of Patent: Oct. 31, 2006

(54) METHOD AND SYSTEM FOR ACCESSING A COLLECTION OF IMAGES IN A DATABASE

(75) Inventors: Qian Lin, Santa Clara, CA (US); Ullas Gargi, Mountain View, CA (US); Hojohn Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 09/984,810

(22) Filed: Oct. 31, 2001

(65) Prior Publication Data
US 2003/0084065 A1 May 1, 2003

(51) Int. Cl.
G06F 17/30 (2006.01)
G06K 9/62 (2006.01)
G06K 9/36 (2006.01)

(52) U.S. Cl. .............. 707/104.1; 707/101; 707/102; 707/103 X; 707/10; 382/224; 382/239

(58) Field of Classification Search ............. 707/104.1, 707/1, 2, 7, 10, 101, 102, 103 X; 382/224, 382/239
See application file for complete search history.

(56) References Cited

U.S. PATENT DOCUMENTS

| | | | |
|---|---|---|---|
| 4,488,245 A | | 12/1984 | Dalke et al. |
| 4,731,865 A | | 3/1988 | Sievenpiper |
| 5,019,975 A | | 5/1991 | Mukai |
| 5,339,108 A | * | 8/1994 | Coleman et al. ......... 375/240.2 |
| 5,528,259 A | | 6/1996 | Bates et al. |
| 5,642,431 A | | 6/1997 | Poggio et al. |
| 5,642,433 A | | 6/1997 | Lee et al. |
| 5,995,978 A | * | 11/1999 | Cullen et al. ............ 707/104.1 |
| 6,023,520 A | * | 2/2000 | Nagasaka et al. ........... 382/107 |
| 6,121,969 A | | 9/2000 | Jain et al. |
| 6,188,831 B1 | * | 2/2001 | Ichimura ..................... 386/69 |
| 6,240,423 B1 | | 5/2001 | Hirata |
| 6,240,424 B1 | * | 5/2001 | Hirata ..................... 707/104.1 |
| 6,285,995 B1 | * | 9/2001 | Abdel-Mottaleb et al. ..... 707/3 |
| 6,341,168 B1 | * | 1/2002 | Nagasaka et al. ........... 382/107 |
| 6,408,301 B1 | * | 6/2002 | Patton et al. ............... 707/102 |
| 6,564,202 B1 | * | 5/2003 | Schuetze et al. ............. 707/2 |
| 6,584,221 B1 | | 6/2003 | Moghaddam et al. |
| 6,628,846 B1 | * | 9/2003 | Craver et al. ............... 382/305 |
| 6,674,880 B1 | * | 1/2004 | Stork et al. ................. 382/128 |
| 6,819,795 B1 | * | 11/2004 | Chiu et al. .................. 382/173 |
| 6,832,272 B1 | * | 12/2004 | Hirakawa et al. ............. 710/36 |
| 2002/0194197 A1 | * | 12/2002 | Flank ....................... 707/104.1 |

(Continued)

FOREIGN PATENT DOCUMENTS

EP 0599466 6/1994

(Continued)

OTHER PUBLICATIONS

Greg Pass, "Histogram Refinement for Content Based Image Retrieval," Computer Science Department, Cornell University, Ithaca, NY 14853, gregpass,redz@cs.cornell.edu, http://www.cs.cornell.edu/home/rdz/refinement.html.

(Continued)

*Primary Examiner*—Thuy N. Pardo

(57) ABSTRACT

A method and system are disclosed for accessing a collection of images in a database. In accordance with exemplary embodiments of the present invention, each of the images is sorted into one of a plurality of time-based clusters. A weighted quality metric is used to assign to each image a quality number as a function of an image analysis heuristic. A representative image is automatically selected from each time-based cluster based on the quality number.

18 Claims, 5 Drawing Sheets

U.S. PATENT DOCUMENTS

| | | | |
|---|---|---|---|
| 2003/0048950 A1* | 3/2003 | Savakis et al. | 382/225 |
| 2003/0049589 A1* | 3/2003 | Feldhake | 434/238 |
| 2003/0059121 A1* | 3/2003 | Savakis et al. | 382/239 |
| 2003/0206668 A1* | 11/2003 | Nakajima et al. | 382/305 |
| 2004/0013305 A1* | 1/2004 | Brandt et al. | 382/224 |

FOREIGN PATENT DOCUMENTS

| | | |
|---|---|---|
| EP | 0990996 | 4/2000 |
| WO | WO9945487 | 9/1999 |

OTHER PUBLICATIONS

Jing Huang, et al., "Image Indexing Using Color Correlograms," Cornell University, Ithaca, NY 14853.

Hideyuki Tamura, et al., "Textural Features Corresponding to Visual Perception," 1978 IEEE, pp. 460-472.

Raouf F.H. Farag et al., "Quantitative Evaluation of Computer Regenerated Images and Their Use in Storage-Restricted Environments," 1978 IEEE, pp. 473.

Christos Faloutsos, et al., "Fast Map: A Fast Algorithm for Indexing, Data-Mining and Visualization of Traditional and Multimedia Datasets," pp. 1-25.

Jianchang Mao et al., "Texture Classification and Segmentation UsingMultiresolution Simultaneous Autoregressive Models," Pattern Recognition, vol. 25, No. 2, pp. 173-188, 1992.

Yossi Rubner, "Perceptual Metrics for Image Database Navigation," Computer Science Department of Stanford University, pp. 1-161.

W. Niblack et al., "The QBIC Project: Querying Images By Content Using Color, Texture, and Shape," IBM Research Division, Almaden Research Center, SPIE vol. 1908 (1993) pp. 173-187.

Michael J. Swain, "Color Indexing," International Journal of Computer Vision, 7.1, 11-32 (1991), pp. 11-32.

* cited by examiner

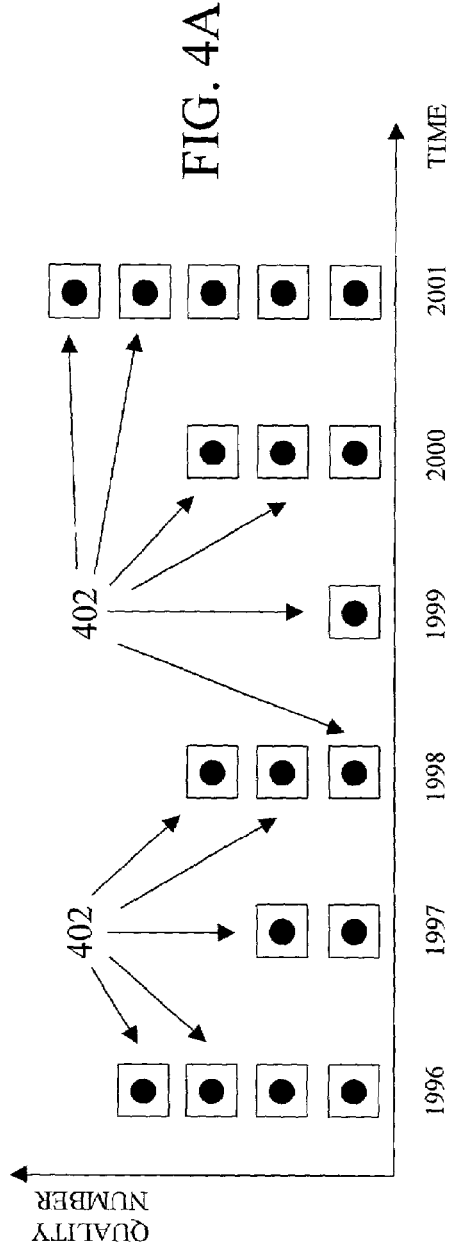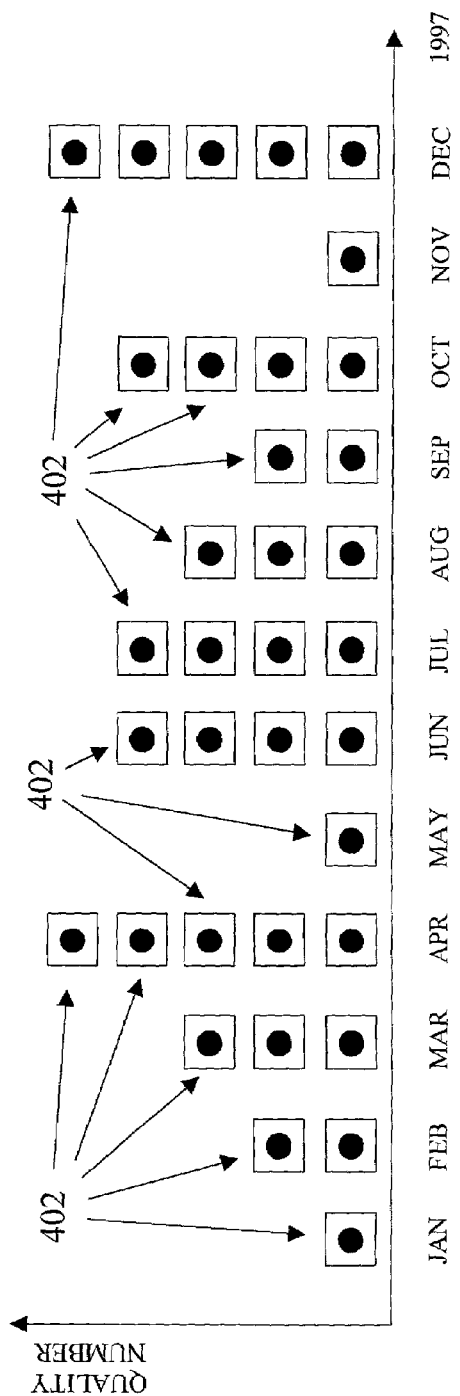

METHOD AND SYSTEM FOR ACCESSING A COLLECTION OF IMAGES IN A DATABASE

BACKGROUND

1. Field of the Invention

The present invention relates to image processing. More particularly, the present invention relates to a method and system for accessing a collection of images in a database.

2. Background Information

Automatic image classification has many important applications. Large image databases or collections require good indexing mechanisms so that images can be categorized effectively, browsed efficiently, and retrieved quickly. Conventional systems store and retrieve specific information from a database using, for example, descriptive information regarding the image file, such as file creation date, file name, file extension and the like. This form of image classification is not significantly different from the classification of any other digital information.

By relying on the file information, only cursory information can be obtained about the file and nothing at all specifically related to the image. For example, an image file could have a name that has no relation to the features or content of the image, such as a black and white image could have the file name "color_image". Other systems provide classification based on the content of the images, such as flowers, dogs, and the like. In practice, this is usually done by keyword annotation, which is a laborious task.

The amount of digital image information available today due to the evolution of the Internet, low-cost devices (e.g., digital video cameras, digital cameras, video capture cards, scanners and the like), and low-cost storage (e.g., hard disks, CDs, and the like) increases the need to classify and retrieve relevant digital image data efficiently. Unlike text-based retrieval, where keywords are successfully used to index into documents, digital image data retrieval has no easily accessed indexing feature.

One approach to navigating through a collection of images for the purpose of image retrieval is disclosed by Yossi, R., "Perceptual Metrics for Image Database Navigation," PHD Dissertation, Stanford University May 1999, which is incorporated herein by reference in its entirety. The appearance of an image is summarized by distributions of color or texture features, and a metric is defined between any two such distributions. This metric, called the "Earth Mover's Distance" (EMD), represents the least amount of work that is needed to rearrange the images from one distribution to the other. The EMD measures perceptual dissimilarity which is desirable for image retrieval. Multi-Dimensional Scaling (MDS) is employed to embed a group of images as points in a 2- or 3-dimensional (2D or 3D) Euclidean space so that their distances reflect the image dissimilarities. This structure allows the user to better understand the result of a database query and to refine the query. The user can iteratively repeat the process to zoom into the portion of the image space of interest.

It would be desirable to provide a method and system for interactively accessing a large collection of images contained in a database that have been collected over a period of time and that allows for fast browsing and searching of those images.

SUMMARY OF THE INVENTION

A method and system are disclosed for accessing a collection of images in a database. In accordance with exemplary embodiments of the present invention, each of the images is sorted into one of a plurality of time-based clusters. A weighted quality metric is used to assign to each image a quality number as a function of an image analysis heuristic. A representative image is automatically selected from each time-based cluster based on the quality number.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein:

FIGS. 4A and 4B illustrate exemplary two-dimensional graphs for displaying representative images in accordance with an exemplary embodiment of the present invention.

DETAILED DESCRIPTION OF THE PREFERRED EMBODIMENTS

Figure 1:
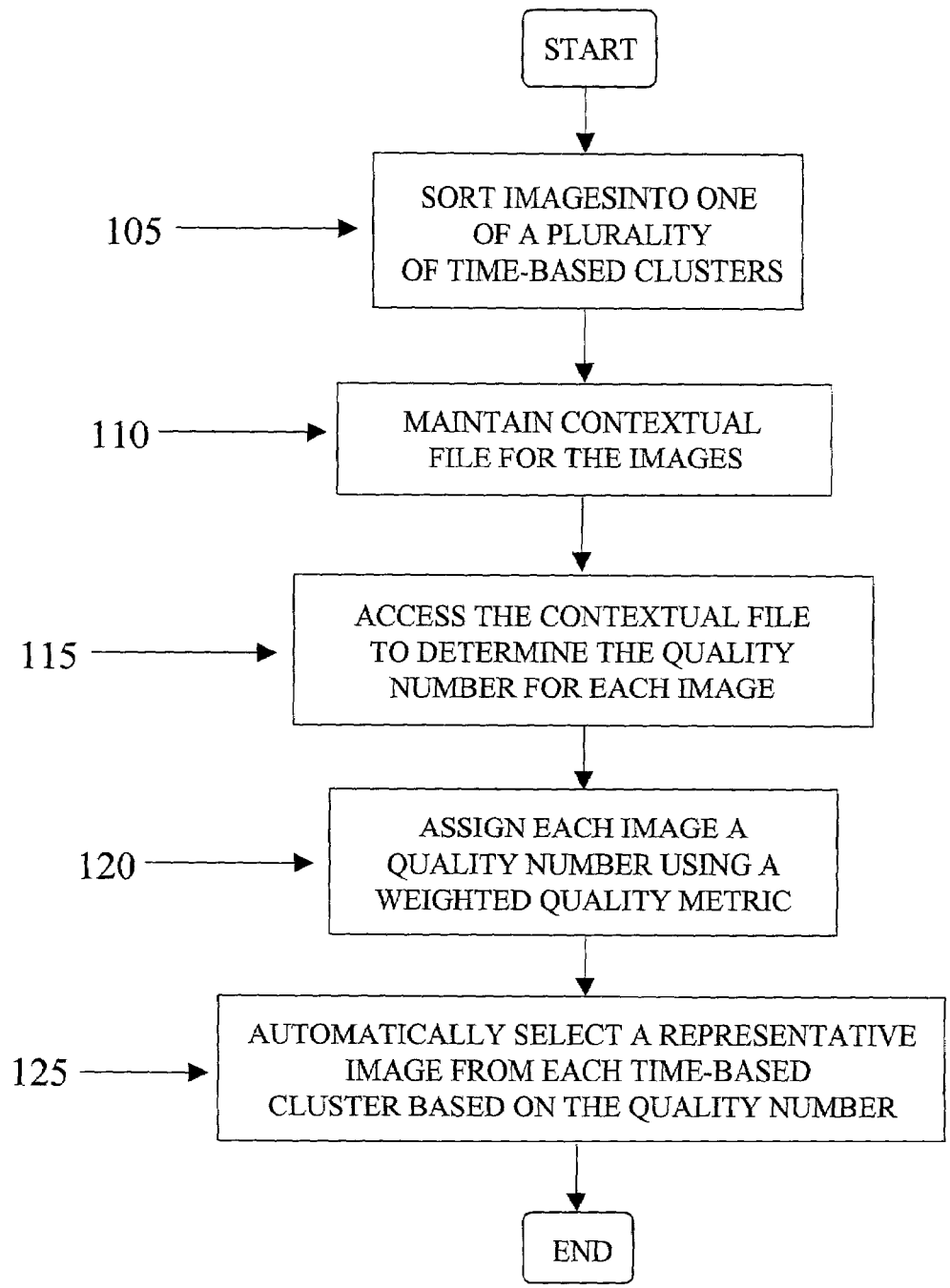
FIGS. 1, 2 and 3 are flowcharts illustrating the steps carried out for accessing a collection of images in a database in accordance with an exemplary embodiment of the present invention.
Figure 2:
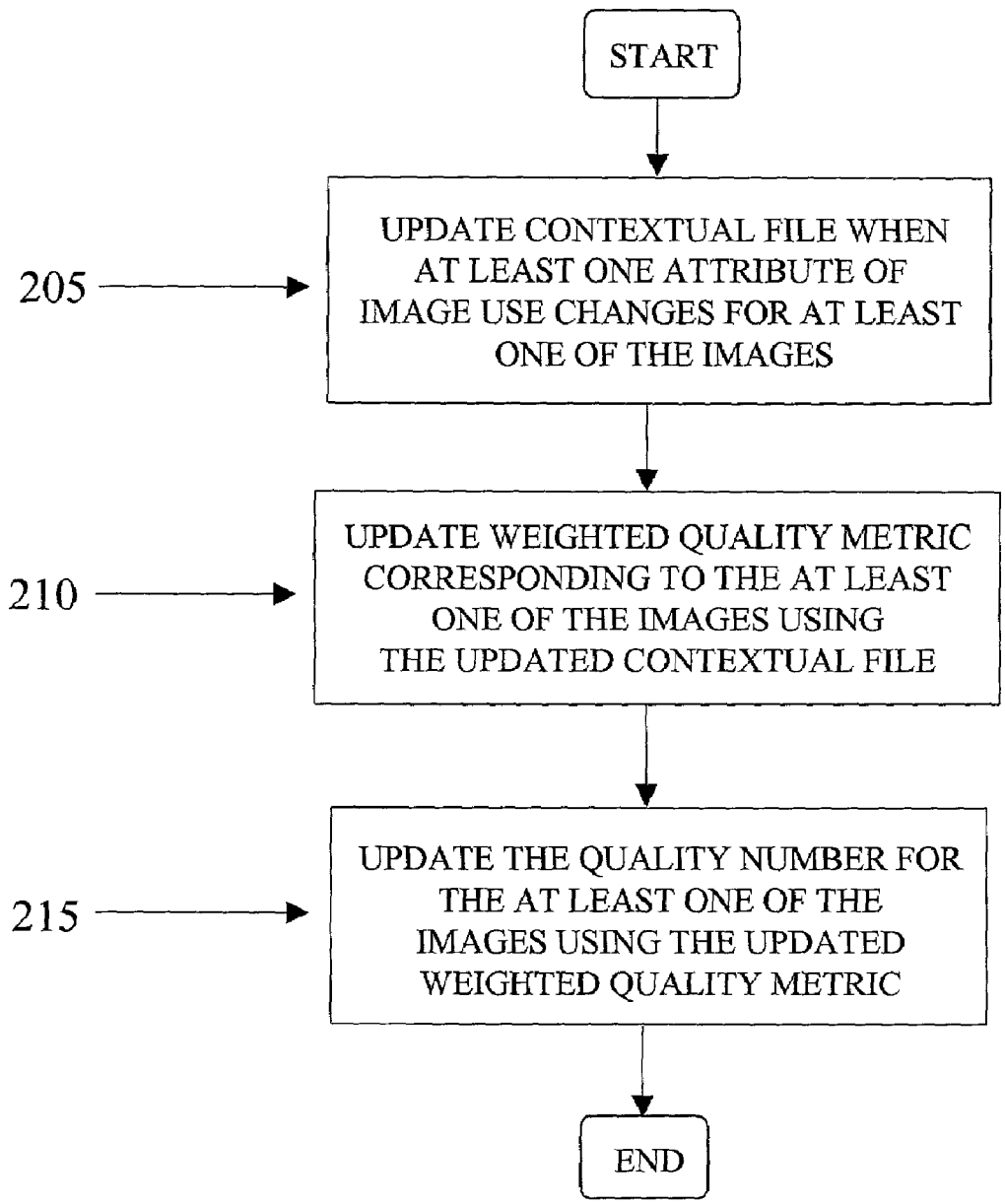
Figure 3:
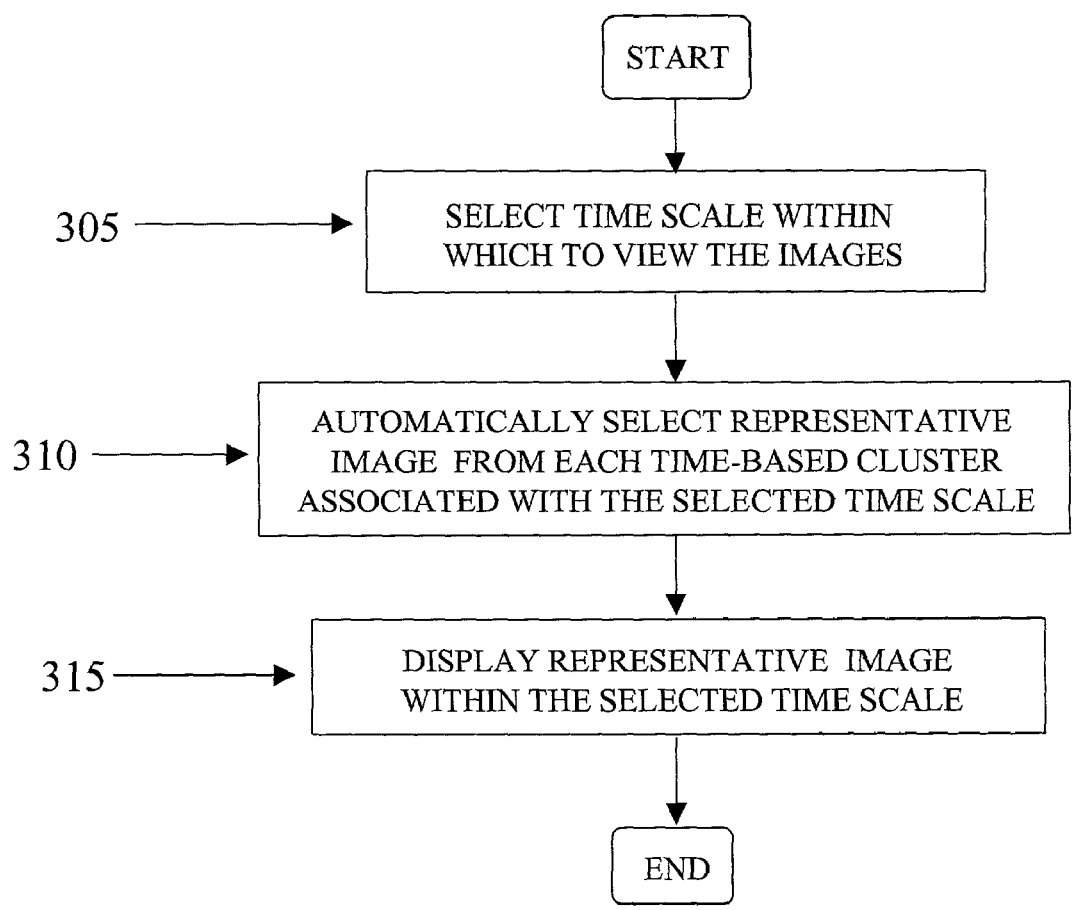

FIGS. 1, 2 and 3 are flowcharts illustrating the steps carried out for accessing a collection of images in a database in accordance with an exemplary embodiment of the present invention. The image database can be any computer database that can be used to store images or any form of electronic data. In step 105 of FIG. 1, each of the images in the database is sorted into one of a plurality of time-based clusters. As used herein, an "image" is any image or electronic data file that is stored in electronic form in any type of electronic storage medium or computer memory. An image can be any digital image captured from any type of digital image capturing device, such as, for example, digital video cameras, digital cameras, video capture cards or any other image capturing device. Alternatively, an image can be an analog image captured from, for example, cameras, video cameras or any other analog image capture device, that are scanned or otherwise digitized and stored as a digital image. An image can also be an electronic document, such as, for example, a multimedia document that contains images, video, sound, etc. Thus, those of ordinary skill in the art will recognize that the image can be any type of electronic data file that a user can access from a collection of electronic data files.

As used herein, a "time-based cluster" is a subset of the entire collection of images contained in the database, in which the images in the time-based cluster are related by any parameter or parameters. According to exemplary embodiments, the images in a time-based cluster can be related in time, such as, for example, the capture time of the images, the access time of the images, the time the images were digitized, or any other type of temporal relationship of the images. For example, the images in a time-based cluster can be from a certain time period. Alternatively, the images in a time-based cluster can relate to a certain event. However, those of ordinary skill in the art will recognize that the images in a time-cluster can be related in any manner to form a time-based cluster.

In step 110, a contextual information database is maintained for the images. The contextual information database can be any type of computer database that can be used to store any type of information related to the images. The contextual information database can reside in computer memory or in any type of electronic storage media. The contextual information database can be co-located with the image database in an electronic storage medium. Alternatively, the contextual information database can reside remotely from the image database, for example, in a remote computer memory located in another part of a computer network. If the contextual information database resides externally to the image database, the contextual information database and the image database can be connected using any form of computer network connection or any other form of electronic connection that allows for the transfer of electronic information.

According to exemplary embodiments, the contextual information database can store at least one attribute of image use for each of the images. Each image contained in the image database has a corresponding entry in the contextual information database that indicates, for example, the usage history of the image. As used herein, an "attribute of image use" is any type of information that indicates, for example, the usage history of a particular image that can be used to determine a user's preferences and interests regarding a particular image. The attributes of image use can include, for example, the number of times an image is disseminated by the user (e.g., through e-mail), the number of times an image is accessed or viewed by the user, the number of individuals who receive the image from the user, the number of times a user manipulates an image, or any other information from which it can be determined which images are considered most meaningful and significant to the user.

According to exemplary embodiments, the attributes of image use contained in the contextual information database can be automatically obtained and collected from any application or program from which the user accesses, views, or otherwise manipulates the images in the image database. For example, if the user e-mails a particular image from the image database to a friend or colleague, the record of the associated attribute of image use in the contextual information database corresponding to the particular image can be automatically updated. For example, the image database could communicate with the contextual information database, by any electronic means of communication, to notify the contextual information database of the image access. Alternatively, the e-mail program could communicate with the contextual information database, by any electronic means of communication, to notify the contextual information database of the e-mailing of the particular image. Alternatively, the contextual information database could maintain communication with the image database and/or e-mail program to retrieve the image access and e-mail information from the database and/or e-mail program, respectively, to update the record of attribute of image use information associated with that particular image in the contextual information database.

However, the contextual information database and the application or program from which the user accesses, views, or otherwise manipulates the images in the image database may not be cooperating (e.g., the database and application cannot communicate or are not capable of communicating between them to allow collection of attributes of image use). In such a case, the contextual information database can indirectly obtain and collect the attributes of image use from, for example, the computer operating system instead of directly from the application or program itself. For example, the contextual information database can retrieve the last access time or modification time or any other form of date-time stamp of the image file from the operating system. The access or modification time of the image file can be used by the contextual information database as, for example, an indication of the usage history of the image and, hence, as an attribute of image use. However, any attribute of image use that can be obtained and collected from the computer operating system can be used when the contextual information database and the application or program are not cooperating.

According to an alternative exemplary embodiment, a user can manually add information, such as, for example, attributes of image use, to the contextual information database and manually update that information. Thus, the attributes of image use contained in the contextual information database can be either automatically or manually obtained and collected from any application or program, located either locally or remotely to the contextual information database.

In step 115, the contextual information database is accessed to determine the quality number for each image. In step 120, a weighted quality metric is used to assign to each image the quality number as a function of an image analysis heuristic. According to exemplary embodiments, the weighted quality metric can be any value, parameter, feature or characteristic that is a measure of the quality of an image from the perspective of the user. Thus, the weighted quality metric can indicate, for example, the meaningfulness or significance of an image to the user. In other words, using the weighted quality metric, a determination can be made, for example, of which images the user considers "best," e.g., which images have the most personal meaning, significance and interest to the user. Alternatively, the quality metric can indicate, for example, the characteristics or certain features of an image. For example, the quality metric can indicate the color, brightness, contrast, number of faces contained in the image, or any other characteristic or feature of the image.

According to exemplary embodiments, the quality number can be any value, so long as that value reflects the quality of an image from the perspective of the user based on the weighted quality metric. Thus, the quality number is proportional to the weight of a quality metric. For example, an image that has great meaning or significance to a user (i.e., has a high "quality" to the user) would have a heavily weighted quality metric and, consequently, a large quality number. However, an image that has little or no meaning or significance to a user would have a lightly weighted quality metric and, consequently, a small or zero quality number. Alternatively, an image that has, for example, high contrast, much color, is very bright, or has many faces would have a heavily weighted quality metric and, consequently, a large quality number. However, an image that has little or no contrast, color, or brightness or has few faces may have a lightly weighted quality metric and, consequently, a small or zero quality number.

As illustrated in FIG. 2, according to exemplary embodiments of the present invention, several steps can be performed as part of the image analysis heuristic, in particular to perform the step of accessing the contextual information database to determine the quality number, as in step 115 of FIG. 1. In step 205 of FIG. 2, the contextual information database is updated when at least one attribute of image use changes for at least one of the images. Thus, as the usage history for the images in the database changes, these changes are reflected in the contextual information database. For example, if a user sends a particular image to a friend or colleague, the contextual information database can be correspondingly updated with the information that, for example, the particular image was accessed by the user.

In step 210, the weighted quality metric corresponding to the at least one of the images is updated using the updated contextual information database. For example, if it is reflected in the contextual information database that, according to an attribute of image use maintained in the contextual information database, a user accesses a particular image many times to view the image, this large number of accesses can be considered an indication that the image has some special meaning or significance to the user relative to other images in the database. As the user continues to access the particular image, this fact can be reflected in the contextual information database (as an attribute of image use). The quality metric can be updated to more heavily weigh the quality metric corresponding to the particular image relative to other images in the time-based cluster of which the particular image is a part.

In step 215, the quality number is updated for the at least one of the images using the updated weighted quality metric. Thus, as the weight of the quality metric for a particular images changes, the quality number assigned based on the weighted quality metric can also change. For example, if the weight of the quality metric for a particular image is high, then the corresponding quality number can be high for the particular image. Conversely, if the weight of the quality metric for the particular image is low, then the corresponding quality number can be low for the particular image.

In step 125 of FIG. 1, a representative image is automatically selected from each time-based cluster for display based on the quality number. The representative image can be at least one image from a time-based cluster that represents all of the images in that time-based cluster. The image used to represent all of the images in a time-based cluster can be a single image or, for example, a hierarchical map, such as that described in commonly-assigned U.S. patent application entitled "Hierarchical Image Feature-Based Visualization", Ser. No. 09/904,627, filed Jul. 16, 2001, the disclosure of which is hereby incorporated by reference in its entirety.

The representative image is the image from the time-based cluster that has the most meaning and significance to the user and, therefore, best represents the images in the time-based cluster. According to exemplary embodiments, the representative image for a time-based cluster can change over time as the user accesses, views, or otherwise manipulates the images in the image database. As the user begins to access certain images more often than others, the quality number for those images accessed more often will change (e.g., increase). Consequently, an image that was originally automatically selected as representative of a time-based cluster could be replaced with another image that the user accesses more often. Thus, the representative image can be selected for a time-based cluster as a function of the information that has been accumulated and stored with respect to the image over time.

Thus, in accordance with exemplary embodiments of the present invention, the image analysis heuristic automatically adapts and learns the preferences and interests of a user for the images stored in the image database. The image analysis heuristic is able, therefore, to adapt to changes in the information contained in the contextual information database—and thus to changes in the user's preferences and interests—to, for example, display the image that is most representative of the images in the time-based cluster. According to an alternative exemplary embodiment, the user can manually select the representative image from a time-based cluster for display, for example, if the user believes that a different image is more representative of the time-based cluster.

Initially, before a user begins accessing, viewing or otherwise manipulating images contained in the image database, little or no information on the attributes of image use for the images may be available or exist in the contextual information database to use for selecting representative images. Until such information becomes available, alternative means can be used to select a representative image. For example, characteristics of the images can be used to select a representative image. Characteristics of the images can include, for example, brightness, contrast, color, the time an image was taken, or any other characteristic of the images that can be used to select a representative image. For example, if an image is very bright, has high contrast, or has many colors, that image could be selected as a representative image, while images that have poor contrast, poor lighting, etc. would not be chosen.

Alternatively, or in combination with the image characteristics, features of the images can be used to select a representative image. Features of the images can include, for example, the number of faces contained in an image, or any other feature of the images that can be used to select a representative image. For example, if an image has many faces, that image could be selected as a representative image, while images that have few faces would not be chosen. According to alternative exemplary embodiments of the present invention, the characteristics and/or features of the images can be used to determine the weighted quality metric for selecting the representative image, even after the user begins accessing, viewing or otherwise manipulating images contained in the image database. According to exemplary embodiments, the user can choose whether to determine the weighted quality metric (and, hence, select the representative image) using the attributes of image use or the characteristics and/or features of the images or some combination of each after the user begins accessing, viewing or otherwise manipulating images contained in the image database.

Determining characteristics of an image is known to those of ordinary skill in the art. For example, determining the brightness of an image is known in the art and is described, for example, in U.S. Pat. No. 4,731,865, the disclosure of which is hereby incorporated by reference. For example, determining the contrast of an image is known in the art and is described, for example, in U.S. Pat. No. 5,642,433, the disclosure of which is hereby incorporated by reference. For example, determining the colors in an image is known in the art and is described, for example, in U.S. Pat. No. 4,488,245, the disclosure of which is hereby incorporated by reference. Determining features of an image is known to those of ordinary skill in the art. Face detection (e.g., determining the number of faces in an image) is known in the art and is described, for example, in U.S. Pat. No. 5,642,431, the disclosure of which is hereby incorporated by reference. Those of ordinary skill in the art will recognize that other methods can be used for determining the weighted quality metric and, hence, the representative image.

As illustrated in FIG. 3, according to exemplary embodiments of the present invention, several steps can be performed as part of the image analysis heuristic, in particular to perform the step of selecting the representative image, as in step 125 of FIG. 1. In step 305 of FIG. 3, a time scale is selected within which to view the images.

An exemplary embodiment for displaying the representative images is illustrated in FIGS. 4A and 4B. As shown in FIG. 4A, the image database can contain images from the years 1996 to 2001, or from any number of years over which the images span. For each year, representative images 402 are displayed. Each year can have any number of representative images 402, depending on, for example, the number of time-based clusters in a particular year and the value of the quality numbers of the representative images of each time-based cluster. Representative images 402 can be displayed graphically, for example, using a two-dimensional axis with "time" as the x-axis and "quality number" as the y-axis. However, representative images 402 can be graphically displayed in any manner in which a user can associate representative images 402 with particular periods of time.

At the time scale shown in FIG. 4A, for example, the year 1997 has two representative images 402. The two representative images 402 can represent, for example, the two images from 1997 with the highest quality numbers (e.g., those representative images with quality numbers that exceed a predetermined threshold). Alternatively, a representative image could be displayed from, for example, each month of 1997 or from any temporal division of 1997 selectable by the user. If the user wishes to view the images in a time-based cluster represented by one of representative images 402 at this level of time scale, the user can simply select that representative image 402 by, for example, clicking on the image using any computer pointer device, such as, for example, a computer mouse. The user can then view, access or otherwise manipulate the images contained in that time-based cluster using, for example, any conventional image viewing software.

According to exemplary embodiments, the user can select a particular time period within which to view the images. As shown in FIG. 4B, if the user chooses, for example, to view the images in 1997, the graphical display can zoom in to display, for example, the months of the year 1997 or any other subset of time for the year 1997 selectable by the user (e.g., Fall, Winter, Spring, and Summer of 1997). The user can select a time scale by, for example, using any computer pointer device, such as, for example, a computer mouse, to click on a particular year to select that year, or use any other method by which a user can graphically select a given time period.

After the user has selected a time scale within which to view the images, in step 310 of FIG. 3, the representative image is automatically selected from each time-based cluster associated with the selected time scale. As the time scale decreases within which representative images are displayed, representative images that were not originally displayed at a larger time scale, because, for example, their quality numbers were not high enough, may become visible at finer resolutions of time. For example, while at the year time scale only two representative images 402 are displayed for 1997 in FIG. 4A, numerous representative images 402 are displayed for the months of 1997 as shown in FIG. 4B. For each month of 1997, for example, a representative image 402 can be displayed for each time-based cluster within that month. Alternatively, only those representative images 402 in a particular month with the highest quality numbers (e.g., those representative images with quality numbers that exceed a predetermined threshold) can be selected for display. However, the representative images 402 for the year 1997 can be displayed based on any time scale for the year 1997 chosen by the user.

According to exemplary embodiments, the representative image from each time-based cluster is selected based on the quality number. However, the representative images selected for a given time period (e.g., the two representative images 402 in year 1997 in FIG. 4A or the five representative images 402 in April 1997 in FIG. 4B) should be selected so that the representative images are representative of the entire time period (e.g., the year of 1997 or the month of April 1997, respectively). Thus, the representative images should be distributed in time throughout the entire time period, rather than having multiple representative images from the same time in the time period. For example, the two representative images 402 in year 1997 in FIG. 4A should be the representative images with the highest quality numbers from different time periods in the year 1997 (e.g., one representative image 402 from December 1997 and one representative image 402 from June 1997 or any other suitable temporal distribution), rather than having both representative images 402 from the same time period in the year 1997 (e.g., both representative images 402 from December 1997). By selecting representative images that are distributed over time within a particular time period, the user is presented with a better overview or representation of the images within the entire given time period. According to exemplary embodiments, the user can choose whether or not such a time distribution is used when selecting the representative images based on quality numbers.

After the representative images have been selected, in step 315 of FIG. 3, the representative image is displayed within the selected time scale. For example, the representative images 402 for the months of 1997 can be displayed as shown in FIG. 4B or in any manner in which a user can associate representative images 402 with particular periods of time. If the user wishes to view the images in a time-based cluster represented by one of representative images 402 at this level of time scale, the user can simply select that representative image 402 by, for example, clicking on the image using any computer pointer device, such as, for example, a computer mouse. The user can then view, access or otherwise manipulate the images contained in that time-based cluster using, for example, any conventional image viewing software.

If a finer resolution of time within which to view representative images is desired by the user, the user can continue the process by selecting another time scale. For example, the user can select a particular month within which to view the representative images 402. For example, the user can select the month of April, or any other month. The representative images 402 for each time-based cluster for each day of the month, or any other subset of time of the month (e.g., first week, second week, third week, fourth week, etc.), can then be displayed to the user. The user can then select a particular day of the month within which to view the images in a time-based cluster represented by the representative images. At the finest resolution of the time scale, the user can be presented with all of the images in the time-based cluster for that time period.

Thus, the user can traverse from, for example, a yearly time scale, to a monthly time scale, to a daily time scale, to an hourly time scale to finally view all of the images in a particular time-based cluster. At each level of the time scale, the user will be presented with the representative images for that time scale, or all of the images in the time-based cluster if the lowest time scale has been reached. The user can then traverse back up the time scale (e.g., from hourly, to daily, to monthly, to yearly) to view representative images in other time periods. At each level of the time scale, the user can select a representative image to view the images in the time-based cluster represented by the representative image.

According to exemplary embodiments, to display the representative images, each representative image of each time-based cluster within the selected time scale can be hierarchically ordered based on at least one of time and the quality number. For example, in FIGS. 4A and 4B, representative images 402 are hierarchically ordered and graphically displayed in a two-dimensional axis that uses "time" for the x-axis and "quality number" for the y-axis, where the time and quality numbers increase as the respective axes extend outward from the intersection of the two axes. However, representative images 402 can be graphically displayed in any manner in which a user can associate representative images 402 with particular periods of time.

Those of ordinary skill in the art will recognize that the embodiment illustrated in FIGS. 4A and 4B is merely an example that is used to facilitate an understanding of the present invention. Those of ordinary skill in the art will recognize that the representative images and the images can be displayed using other methods of presentation. For example, instead of displaying representative images in columns parallel to the y-axis according to quality number, for each column the representative images could be stacked on top of each other so that the highest quality representative image for that column is on top and lower quality number representative images are positioned behind it in decreasing order or vice versa. Thus, a single representative image in each column would be displayed to the user at a time. The user could then click or otherwise select the representative image on top either to view the top representative image or to access the next representative image in the stack. By repeatedly clicking on the representative images in a stack, the user can cycle through all representative images in a stack. A method and system for viewing multiple images is described, for example, in commonly-assigned U.S. patent application Ser. No. 09/819,326, filed Mar. 28, 2001, the disclosure of which is hereby incorporated by reference. The representative images and the images can be displayed to a user using any type of display, such as a computer monitor or any other video display device for displaying graphical and/or textual information to a user.

Figure 5:
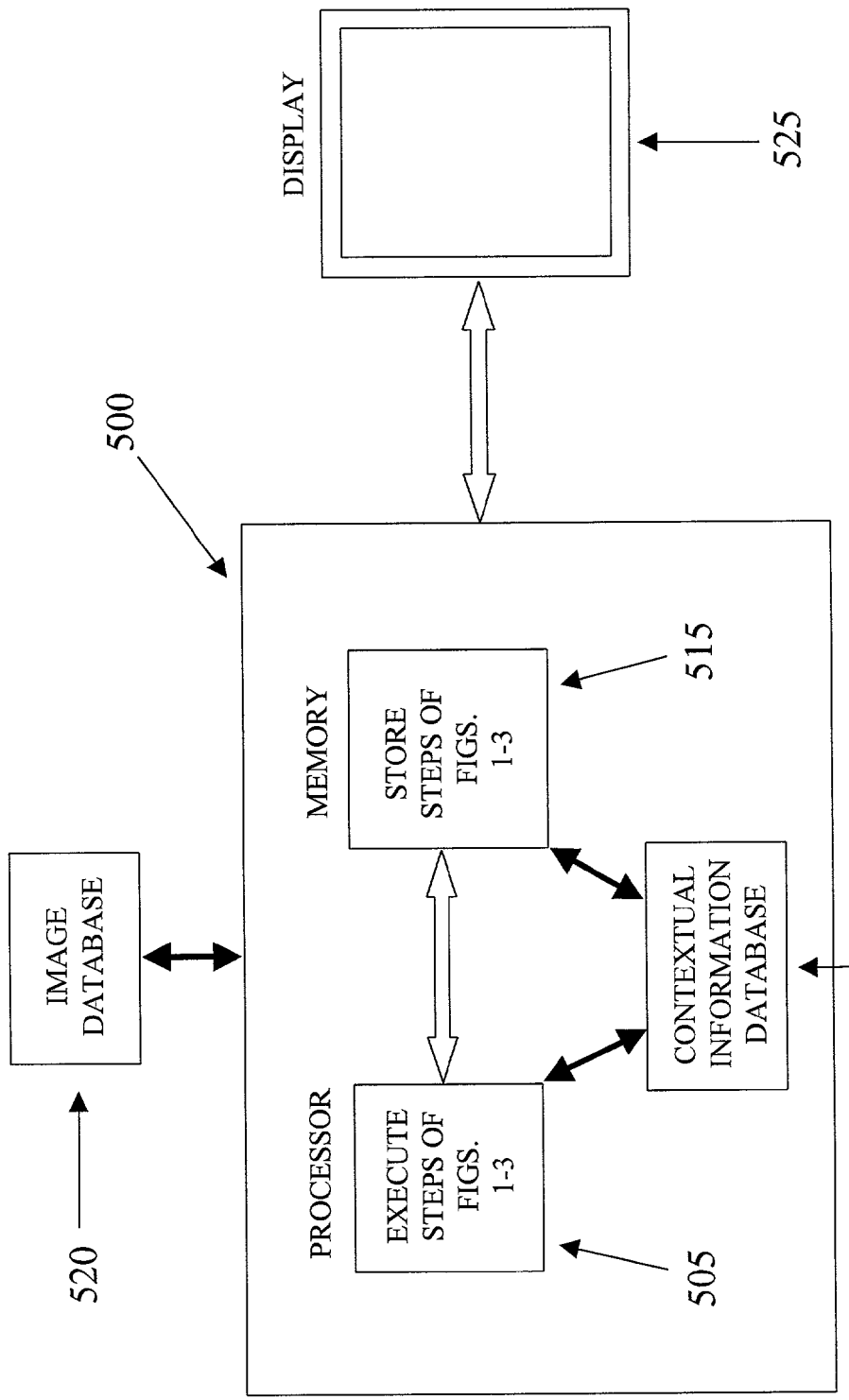
FIG. 5 illustrates a system for accessing a collection of images in a database in accordance with an exemplary embodiment of the present invention.

A system for accessing a collection of images in a database in accordance with an exemplary embodiment of the present invention will be described with reference to FIG. 5. An image database 520 can be any computer database that can be used to store images or any form of electronic data.

According to exemplary embodiments, the steps of a computer program as illustrated in FIGS. 1–3 can be performed using a computer 500, such as, for example, a personal computer or any other computer system. Computer 500 can include a memory 515. Memory 515 can be any computer memory or any other form of electronic storage media that is located either internally or externally to computer 500. Memory 515 can store, for example, the steps of a computer program as illustrated in FIGS. 1–3. As will be appreciated based on the foregoing description, memory 515 can be programmed using conventional techniques known to those having ordinary skill in the art of computer programming to carry out the steps of a computer program as illustrated in FIGS. 1–3 described herein. The actual source code or object code for carrying out the steps of a computer program as illustrated in FIGS. 1–3 can be stored in memory 515.

Image database 520 can reside either internally or externally to computer 500. If image database 520 is located externally to computer 500, image database 520 can be, for example, accessed remotely via a computer network using any network connection, such as, for example, an Ethernet connection. Alternatively, image database 520 can be connected to computer 500 using any form of electrical connection over which image information and any other form of electronic information can be communicated.

Memory 515 can store steps of a computer program to sort each of the images into one of a plurality of time-based clusters, use a weighted quality metric to assign to each image a quality number as a function of an image analysis heuristic, and automatically select a representative image from each time-based cluster for display based on the quality number. Memory 515 can also store the steps of a computer program to maintain a contextual information database (e.g., contextual information database 510) for the images, and access the contextual information database (e.g., contextual information database 510) to determine the quality number for each image.

Contextual information database 510 can be any type of computer database that can be used to store any type of information related to the images. Contextual information database 510 can reside in, for example, memory 515 or in any type of electronic storage media located either internally or externally to computer 500. Contextual information database 510 can be co-located with image database 520 in an electronic storage medium. Alternatively, contextual information database 510 can reside separately from image database 520. For example, contextual information database 510 can reside in computer 500 while image database 520 can reside in a remote computer memory located in another part of a computer network. If contextual information database 510 resides separately from image database 520, contextual information database 510 and image database 520 can be connected using any form of computer network connection, such as, for example, an Ethernet connection, or any other form of electronic connection that allows that transfer of any type of electronic information. According to exemplary embodiments, contextual information database 510 can store at least one attribute of image use for each of the images.

Memory 515 can store the steps of a computer program to update the contextual information database when at least one attribute of image use changes for at least one of the images, update the weighted quality metric corresponding to the at least one of the images using the updated contextual information database, and update the quality number for the at least one of the images using the updated weighted quality metric. Memory 515 can also store the steps of a computer program to select a time scale within which to view the images, automatically select the representative image from each time-based cluster associated with the selected time scale, and display the representative image within the selected time scale.

The representative images and the images contained in the time-based clusters can be displayed to the operator on a display, such as, for example, display 525, that is used in conjunction with computer 500. Display 525 can be a computer monitor or any other video display device for displaying graphical and/or textual information to a user. According to exemplary embodiments, each representative image of each time-based cluster within the selected time scale can be hierarchically ordered based on at least one of time and the quality number.

Computer 500 can also include a processor 505 for accessing memory 515 to execute the steps of a computer program as illustrated in FIGS. 1–3. Processor 505 can be any known processor, such as, for example, a microprocessor. Computer 500 can also be connected to at least one other computer in a computer network using any form of network connection, such as, for example, an Ethernet connection.

The steps of a computer program as illustrated in FIGS. 1–3 for accessing a collection of images in a database can be embodied in any computerreadable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). The computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for accessing a collection of images in a database, comprising the steps of:
    sorting each of the images into one of a plurality of time-based clusters;
    using a weighted quality metric to assign to each image a quality number as a function of an image analysis heuristic, the quality number being based on at least contextual information relating to usage history of the image; and
    automatically selecting a representative image from each time-based cluster based on the quality number.

2. The method of claim 1, comprising the steps of:
    maintaining a contextual information database for the images; and
    accessing the contextual information database to determine the quality number for each image.

3. The method of claim 2, wherein the contextual information database stores at least one attribute of image use for each of the images.

4. The method of claim 2, wherein the step of accessing comprises the steps of:
    updating the contextual information database when at least one attribute of image use changes for at least one of the images;
    updating the weighted quality metric corresponding to the at least one of the images using the updated contextual information database; and
    updating the quality number for the at least one of the images using the updated weighted quality metric.

5. The method of claim 1, wherein the step of selecting comprises the steps of:
    selecting a time scale within which to view the images;
    automatically selecting the representative image from each time-based cluster associated with the selected time scale; and
    displaying the representative image within the selected time scale.

6. The method of claim 5, wherein the step of displaying comprises the step of:
    hierarchically ordering each representative image of each time-based cluster within the selected time scale based on at least one of time and the quality number.

7. A system for accessing a collection of images in a database, comprising:
    a memory that stores the steps of a computer program to:
        sort each of the images into one of a plurality of time-based clusters,
        use a weighted quality metric to assign to each image a quality number as a function of an image analysis heuristic and contextual information relating to usage history of the image, and
        automatically select a representative image from each time-based cluster based on the quality number; and
    a processor for accessing the memory to execute the computer program.

8. The system of claim 7, wherein the memory stores steps of a computer program to:
    select a time scale within which to view the images;
    automatically select the representative image from each time-based cluster associated with the selected time scale; and
    display the representative image within the selected time scale.

9. The system of claim 8, wherein the memory stores steps of a computer program to:
    hierarchically order each representative image of each time-based cluster within the selected time scale based on at least one of time and the quality number.

10. The system of claim 7, wherein the memory stores steps of a computer program to:
    maintain a contextual information database for the images; and
    access the contextual information database to determine the quality number for each image.

11. The system of claim 10, wherein the contextual information database stores at least one attribute of image use for each of the images.

12. The system of claim 10, wherein the memory stores steps of a computer program to:
    update the contextual information database when at least one attribute of image use changes for at least one of the images;
    update the weighted quality metric corresponding to the at least one of the images using the updated contextual information database; and
    update the quality number for the at least one of the images using the updated weighted quality metric.

13. A computer-readable medium containing a computer program that performs the steps of:
    sorting each of the images into one of a plurality of time-based clusters;

using a weighted quality metric to assign to each image a quality number as a function of an image analysis heuristic, the quality number being based on contextual information relating to usage history of the image; and automatically selecting a representative image from each time-based cluster based on the quality number.

14. The computer-readable medium of claim 13, wherein the computer program performs the steps of:

selecting a time scale within which to view the images;

automatically selecting the representative image from each time-based cluster associated with the selected time scale; and displaying the representative image within the selected time scale.

15. The computer-readable medium of claim 14, wherein the computer program performs the step of:

hierarchically ordering each representative image of each time-based cluster within the selected time scale based on at least one of time and the quality number.

16. The computer-readable medium of claim 13, wherein the computer program performs the steps of:

maintaining a contextual information database for the images; and accessing the contextual information database to determine the quality number for each image.

17. The computer-readable medium of claim 16, wherein the contextual information database stores at least one attribute of image use for each of the images.

18. The computer-readable medium of claim 16, wherein the computer program performs the steps of:

updating the contextual information database when at least one attribute of image use changes for at least one of the images;

updating the weighted quality metric corresponding to the at least one of the images using the updated contextual information database; and updating the quality number for the at least one of the images using the updated weighted quality metric.

* * * * *

UNITED STATES PATENT AND TRADEMARK OFFICE
CERTIFICATE OF CORRECTION

PATENT NO. : 7,130,864 B2
APPLICATION NO. : 09/984810
DATED : October 31, 2006
INVENTOR(S) : Qian Lin et al.

It is certified that error appears in the above-identified patent and that said Letters Patent is hereby corrected as shown below:

On the Title page, in field (75), in "Inventors", in column 1, line 3, delete "Hojohn" and insert -- Ho John --, therefor.

Signed and Sealed this

Fifteenth Day of December, 2009

David J. Kappos
*Director of the United States Patent and Trademark Office*